April 1, 1958     A. F. BOHNHOFF ET AL     2,828,722
WINDSHIELD WIPER MOTOR
Filed Jan. 12, 1956     3 Sheets-Sheet 1

INVENTORS
ARTHUR F. BOHNHOFF
CHARLES W. SPALDING
BY Craig V. Morton
THEIR ATTORNEY April 1, 1958 A. F. BOHNHOFF ET AL 2,828,722
WINDSHIELD WIPER MOTOR
Filed Jan. 12, 1956 3 Sheets-Sheet 3

INVENTORS
ARTHUR F. BOHNHOFF
BY CHARLES W. SPALDING

Craig V. Morton
THEIR ATTORNEY

United States Patent Office

2,828,722
Patented Apr. 1, 1958

2,828,722

WINDSHIELD WIPER MOTOR

Arthur F. Bohnhoff and Charles W. Spalding, Saginaw, Mich., assignors to General Motors Corporation, Detroit, Mich., a corporation of Delaware Application January 12, 1956, Serial No. 558,640

9 Claims. (Cl. 121—130)

This invention pertains to vehicle windshield wipers, and particularly to an improved fluid pressure operated windshield wiper motor.

One of the objectionable characteristics of conventional windshield wiper motors is that of overtravel at the running stroke ends, which is caused by abrupt movement reversals. In the past, it has been proposed to incorporate resilient cushioning devices in windshield wiper transmission assemblies to obviate this difficulty. The present invention relates to a fluid pressure operated wiper motor having means for automatically decelerating piston movement adjacent the running stroke ends. In addition, the instant wiper motor incorporates means for adjusting the running stroke length and means for extending piston movement at one end of the running stroke to park the windshield wipers. Accordingly, among our objects are the provision of a windshield wiper motor including means for automatically decelerating piston movement adjacent the running stroke ends; the further provision of a wiper motor having means for adjusting the length of running stroke; the further provision of a wiper motor including means for parking the wipers outside of their normal running stroke; and the still further provision of an expansible chamber wiper motor having two running chambers and an independent parking chamber.

The aforementioned and other objects are accomplished in the present invention by designing a wiper motor having a pair of opposed, expansible running chambers and a single expansible parking member. Specifically, the improved wiper motor includes a stationary cylinder, the ends of which are closed by cap members. A reciprocable piston is disposed within the cylinder, the piston having an integral rack which engages a sector gear attached to an oscillatable wiper actuating shaft. The movable piston is formed with three parallel, longitudinally extending, stepped through bores. One end of each bore is closed by a plug. Two of the stepped diameter bores constitute opposed, expansible running chambers and receive stationary running piston assemblies which are carried by the end caps. Each running piston is formed with passage means therethrough which interconnect the running chambers and a pair of external control ports, which are alternately connected to pressure and drain by an alternator valve assembly of the type disclosed in copending application Serial No. 558,690, filed of even date herewith, in the name of Walter H. West, and assigned to the assignee of this invention. The passage means of alternate running pistons are gradually closed adjacent the running stroke ends to decelerate the movable piston, and when the passage means are closed, the pressure in one or the other expansible chamber will build up so as to actuate the reversing valve means of the alternator control valve assembly. The length of the running stroke may be readily adjusted during assembly of the wiper motor by interposing shims between the stationary running pistons and the end cap supports therefor. One end cap also carries a stationary parking piston having passage means therethrough interconnecting a cylinder parking port and the expansible parking chamber. However, in this instance, the passage means in the parking piston are not closed by the sidewalls of the parking chamber, and in this manner, the stroke of the movable piston is extended adjacent one end of the running stroke for parking purposes. The parked position of the motor piston is determined by engagement between one end of the piston and one of the cylinder end caps.

In order to connect one running chamber to drain when the opposed chamber is connected to pressure, the stationary running pistons include spring-biased, one-way check valves, as will be pointel out more particularly hereinafter. During wiper motor operation, the pressure and drain connections of the control ports are automatically reversed to maintain the movable piston in a state of continuous reciprocation. The cylinder cavity is always connected to exhaust through a drain port. When wiper motor operation is interrupted, fluid under pressure is admitted to the parking port, as well as one of the running ports, while the opposed running port is connected to drain. In this manner, the stroke of the motor piston is extended and the piston comes to rest in the parked position outside of the normal running stroke.

Further objects and advantages of the present invention will be apparent from the following description, reference being had to the accompanying drawings wherein a preferred embodiment of the present invention is clearly shown.

Figures 1, 2, 3:
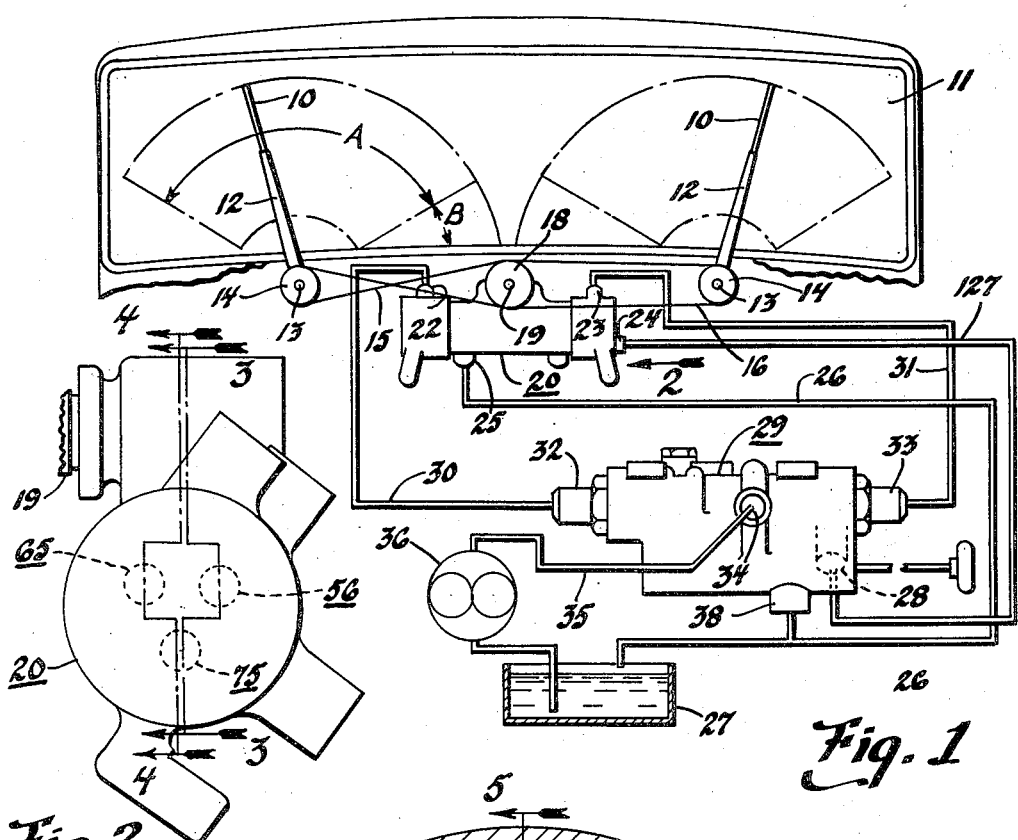
Fig. 1 is a schematic view, partly in section and partly in elevation, illustrating a windshield wiper mechanism including the improved wiper motor of this invention.
Fig. 2 is an enlarged end view of the wiper motor taken in the direction of arrow 2 in Fig. 1.
Figure 4:
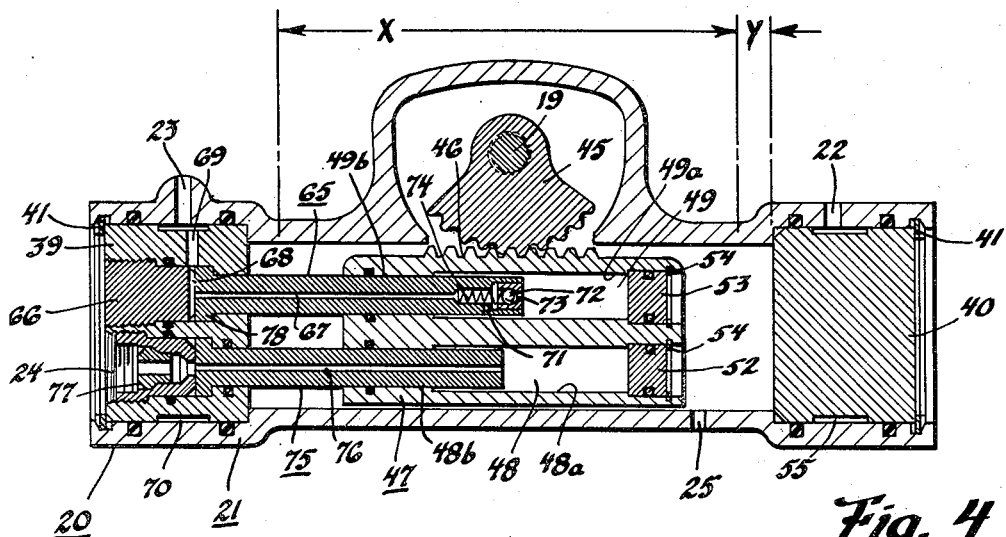

Figs. 3 and 4 are enlarged sectional views taken along lines 3—3 and 4—4 of Fig. 2.

Figure 5:
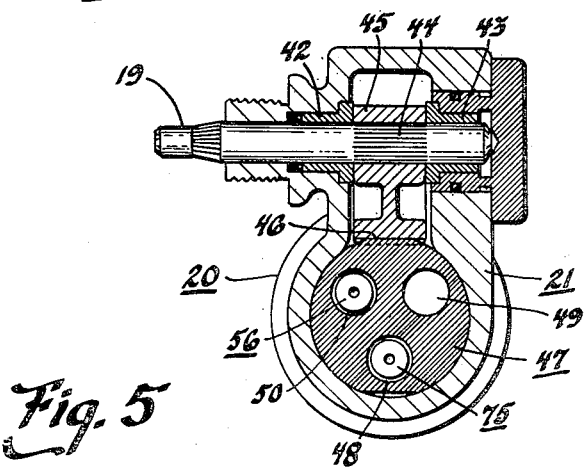

Fig. 5 is a sectional view taken along line 5—5 of Fig. 3.

Figure 6:
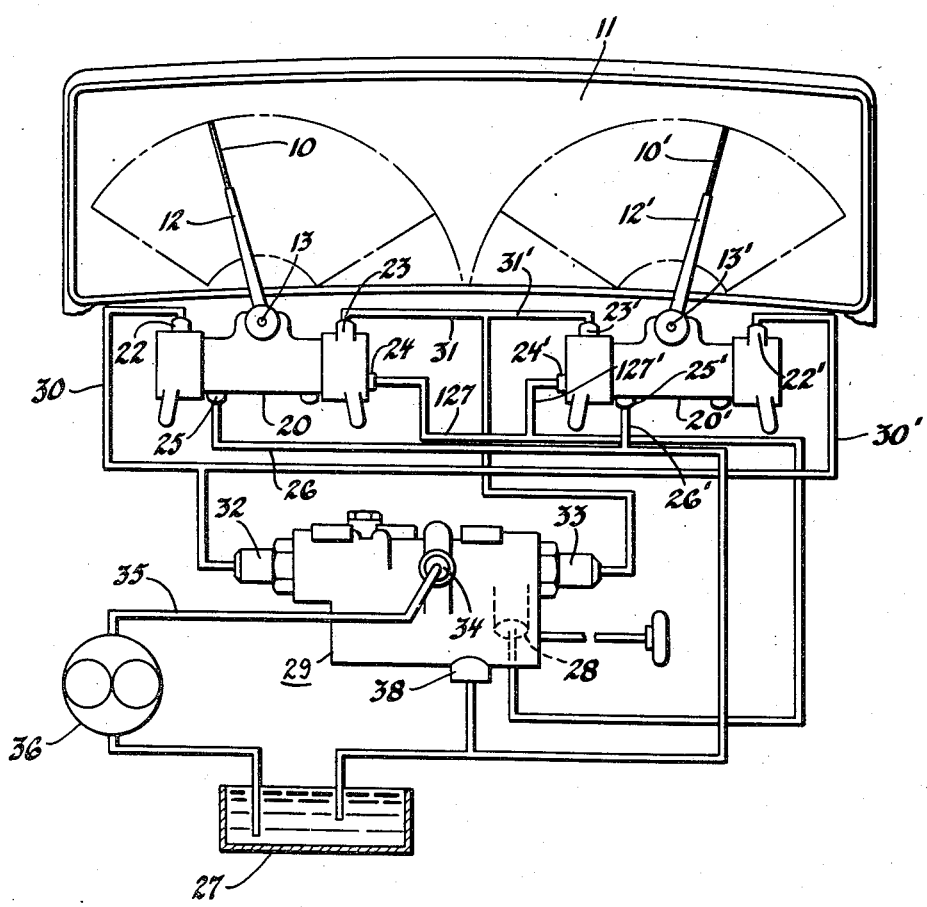

Fig. 6 is a schematic view depicting windshield cleaning mechanism including an independent wiper motor for each blade.

With particular reference to Fig. 1, vehicle windshield wiper mechanism is depicted comprising a pair of blades 10, arranged for simultaneous asymmetrical movement across a windshield 11. The blades 10 are carried by arms 12, which are driven by transmission shaft 13. The shafts 13 carry pulley assemblies 14, which are connected by cable drives 15 and 16 to an auxiliary drive pulley 18. The auxiliary drive pulley 18 is drivingly connected to an oscillatable wiper motor driven shaft 19. The blades 10 are arranged for movement throughout a wiping stroke, indicated by A, during running operation of the wiper motor 20, and are moved throughout the angle B to a parked position when the motor 20 is deactivated.

The wiper motor 20 includes a cylinder 21 having a pair of running ports 22 and 23, a parking port 24 and a drain port 25. The drain port 25 is connected by a conduit 26 to a sump, or reservoir, 27. The parking port 24 is connected by a conduit 127 to a parking port 28 of an alternator valve assembly, generally depicted by the numeral 29, which is of the type disclosed in the aforementioned copending application Serial No. 558,690. Control ports 22 and 23 of the wiper motor 20 are connected by conduits 30 and 31, respectively, to control ports 32 and 33 of the alternator valve assembly 29. The alternator valve assembly 29 also includes a pressure inlet port 34, which is connected by a conduit 35 to the outlet side of a hydraulic pump 36, the inlet of which is connected to the sump 27. In addition, the alternator valve assembly 29 includes a drain port 38, which is connected to the sump through conduit 26.

With particular reference to Figs. 2 through 5, the wiper motor cylinder 21 has its ends closed by cap members 39 and 40, which are suitably retained by snap rings 41 against internal shoulders of the cylinder casting. As seen in Fig. 5, the wiper actuating shaft 19 is rotatably journaled in the cylinder casting 21 by sleeve bearings 42 and 43. In addition, the shaft 19 is formed with a longitudinally serrated, or splined, section 44 to which the hub of a sector gear 45 is drivingly connected. The sector gear 45 meshes with an integral rack 46 formed on a piston 47 disposed within the cylinder 21 for reciprocable movement.

As seen in Figs. 3 and 4, the movable piston 47 does not sealingly engage the bore of the cylinder 21. In other words, the cylinder chambers on opposite sides of the piston 47 are always in fluid communication, and the cylinder bore is connected to the drain port 25 at all times.

The movable piston 47 is formed with three, parallel, longitudinally extending through bores 48, 49 and 50. The bores 48, 49 and 50 are of stepped diameter and, thus, include larger diameter sections 48a, 49a and 50a, respectively, as well as smaller diameter sections 48b, 49b and 50b, respectively. The left-hand end of bore 50 is closed by a plug 51, as seen in Fig. 3. The right-hand ends of bores 48 and 49 are closed by plugs 52 and 53, as shown in Fig. 4. The plugs 51, 52 and 53 are retained in position by snap rings 54, as seen in the drawings.

The end cap member 40 comprises a plug having an annular groove 55 therein, which communicates with control port 22. In addition, the end cap 40 supports a stationary running piston assembly 56 by means of a screw threaded plug 57. The piston assembly 56 is formed with a shoulder 58 and a longitudinally extending central passage 59. The passage 59 communicates at one end with the annular groove 55 through a recess 79 in the plug 57 and a passage 60 in the end cap 40. The central passage 59 connects with a radially extending passage 61 adjacent the other end of the stationary running piston 56. In addition, the passage 59 communicates with a spring-biased ball type check valve 62, which prevents communication through its port 63 between the expansible chamber 50 and the passage 59 when the pressure potential of fluid in the passage 59 is greater than the pressure potential of fluid in chamber 50 plus the force of spring 64.

The end cap 39 also carries a stationary running piston assembly 65 in opposing relation to the piston assembly 56. The piston assembly 65 is identical with the piston assembly 56 and, thus, is supported in the end cap 39 by a screw threaded plug 66, and has a central passage 67. The central passage 67 connects at one end with control port 23 through a recess 68 in a plug 66, a passage 69 in the end cap 39, and an annular groove 70 in the end cap 39. Similarly, the other end of the passage 67 connects with a radially extending passage 71, as well as with a spring-biased check valve 72, which controls a port 73, the ball 72 being urged to close the port 73 by a spring 74.

In addition, the end cap 39 carries a stationary parking piston assembly 75 having a central, longitudinally extending passage 76. The parking piston 75 is supported in the end cap 39 by a hollow screw threaded plug 77, which communicates with the parking port 24. The passage 76 in the parking piston 75 communicates at all times with the expansible parking chamber 48 in the movable motor piston 47.

The length of the running stroke of the movable piston 47 is indicated by X in Fig. 4. One of the desirable features of the instant motor assembly resides in the fact that the length of the running stroke can be readily adjusted during assembly of the motor by interposing shims between the shoulders 58 and 78 of the stationary running pistons 56 and 65, respectively, and the internal shoulders of the cap members 40 and 39, respectively. This result is accomplished since the ends of the running stroke of the piston 47 are determined by the position of the piston 47 within the cylinder 21, at which the radial passages 61 and 71 of the stationary pistons 56 and 65, respectively, are closed by the smaller diameter bore sections 50b and 49b of the chambers 50 and 49, respectively.

*Operation*

During running operation of the wiper motor as controlled by the alternator valve assembly 29, the pressure and drain connections of the running ports 22 and 23 are automatically reversed. In this manner, the movable piston 47 is maintained in a state of continuous reciprocation. When the port 22 is connected to pressure and the port 23 is connected to drain, fluid under pressure will flow through port 22, annular groove 55, passage 60, recess 79, and passages 59 and 61 of the stationary piston 56 to the expansible chamber 50. At this time, the check valve 62 will close the port 63. At the same time, the expansible chamber 49 is connected to drain through the check valve port 73, and radial passage 71 if this passage is disposed in the larger diameter bore section 49a, passage 67, recess 68, passage 69, annular groove 70 and the port 23. At this time, the parking port 24 is connected to drain, as is the cavity in cylinder 21. Accordingly, the piston 47 will move to the left, as viewed in Fig. 3, until the smaller diameter section 50b of the bore 50 closes the passage 61. As passage 61 is closed, movement of the piston 47 to the left will be decelerated. When the passage 61 is completely closed, movement of the piston 47 to the left will cease, and the pressure in the control conduit 30 will build up so as to actuate reversing valve means of the alternator valve assembly 29.

When the reversing valve means of the alternator valve assembly 29 shifts to connect port 33 to pressure and port 32 to drain, motor port 23 will be connected to pressure and motor port 22 will be connected to drain. Thus, the expansible chamber 49 will be subjected to fluid under pressure through port 23, annular groove 70, recess 68, and passages 67 and 71. At this time, the expansible chamber 50 will be connected to drain through check valve port 63, passage 59, recess 79, passage 60, annular groove 55, and port 22. Thus, the movable piston 47 will move to the right, as viewed in Figs. 3 and 4, until the radial passage 71 in the stationary running piston 65 is closed by the smaller diameter bore section 49b, at which time, the reversing valve means of the alternator valve assembly 29 will again reverse the pressure and drain connections of the ports 32 and 33 so as to maintain the wiper motor piston 47 in a state of continuous reciprocation at a variable speed due to the automatic deceleration at the running stroke ends.

When pressure fluid is admitted to the parking port 24, the running port 23 is, likewise, subjected to pressure. At this time, the running port 22 is connected to drain. Accordingly, fluid under pressure will be admitted to expansible chambers 48 and 49. Pressure fluid will continue to be applied to expansible chamber 49 until the passage 71 is cut off at the normal running stroke end. However, the piston 47 will continue to move to the right, as viewed in Figs. 3 and 4, until the right-hand end thereof abuts the end cap 40 since the expansible chamber 48 is still subjected to pressure fluid through passage 76 in the parking piston 75, the hollow screw plug 77 and the port 24. Thus, the stroke is extended throughout the distance Y, as viewed in Fig. 4, for parking the wiper blades 10 against the cowl of the vehicle.

With reference to Fig. 6, a vehicle cleaning installation wherein each wiper blade is driven by an independent hydraulic motor is depicted, similar reference numerals depicting similar parts throughout the several views. Thus, the wiper blades 10, 10' are connected to arms 12, 12' which are attached to transmission shafts 13, 13'. In Fig. 6, the cable drive arrangement is eliminated, and shafts 13, 13' are directly connected to wiper motors 20, 20' which are hydraulically synchronized by the alternator valve assembly 29. Thus, the motor control ports 22, 23 and 22', 23' are connected by conduits 30, 31 and 30', 31', respectively, to control ports 32 and 33 of the valve assembly. The parking ports 24, 24' of the motors are connected by conduits 127, 127' to the valve port 28. The motor drain ports 25, 25' are connected by conduits 26, 26' to the sump 27. Operation of the system in Fig. 6 is identical to that described hereinbefore.

From the foregoing, it is apparent that the present invention provides a unique fluid pressure operated wiper motor wherein the movement of the motor piston is automatically decelerated adjacent the running stroke ends. In addition, the length of the running stroke may be readily adjusted during motor assembly. Furthermore, the wiper motor embodies means for extending the stroke outside the running range for parking purposes.

While the embodiment of the present invention as herein disclosed, constitutes a preferred form, it is to be understood that other forms might be adopted.

What is claimed is as follows:

1. A windshield wiper motor comprising, a cylinder having a movable piston therein capable of fluid pressure actuation in both directions, opposed expansible chamber means subject to alternate fluid pressure application for effecting movement of said piston in opposite directions throughout a running stroke, and an independent expansible chamber means subject to fluid pressure application for effecting movement of said piston beyond one end of said running stroke to a parked position when one of said opposed expansible chamber means is simultaneously connected to drain.

2. A windshield wiper motor including, a cylinder having a reciprocable piston therein capable of fluid pressure actuation in both directions, a pair of opposed expansible chambers which are subject to alternate fluid pressure application for effecting reciprocation of said piston in opposite directions throughout a running stroke, and an independent expansible chamber which is subject to the application of fluid under pressure for effecting movement of said piston beyond one end of said running stroke to a parked position when one of said opposed expansible chambers is simultaneously connected to drain and the other opposed expansible chamber is subject to the application of fluid under pressure.

3. A windshield wiper motor including, a cylinder having a reciprocable piston therein capable of fluid pressure actuation in both directions, a pair of opposed expansible chambers which are subject to alternate fluid pressure application for effecting reciprocation of said piston in opposite directions throughout a running stroke, means for adjusting the length of said running stroke, and an independent expansible chamber which is subject to the application of fluid under pressure for effecting movement of said piston beyond one end of said running stroke to a parked position when one of said opposed expansible chamber means is simultaneously connected to drain.

4. A windshield wiper motor including, a cylinder having a reciprocable piston therein capable of fluid pressure actuation in both directions, a pair of opposed expansible chambers which are subject to alternate fluid pressure application for effecting reciprocation of said piston in opposite directions throughout a running stroke, means for decelerating said piston adjacent the ends of the running stroke, and an independent expansible chamber which is subject to the application of fluid under pressure for effecting movement of said piston beyond one end of said running stroke to a parked position when one of said opposed expansible chamber means is simultaneously connected to drain.

5. A windshield wiper motor including, a cylinder having a reciprocable piston therein capable of fluid pressure actuation in both directions, a pair of opposed expansible chambers which are subject to alternate fluid pressure application for effecting reciprocation of said piston in opposite directions throughout a running stroke, means for adjusting the length of said running stroke, means for decelerating said piston adjacent the ends of the running stroke, and an independent expansible chamber which is subject to the application of fluid under pressure for effecting movement of said piston beyond one end of said running stroke to a parked position when one of said opposed expansible chamber means is simultaneously connected to drain.

6. A windshield wiper motor including, a cylinder, a reciprocable member disposed in said cylinder and having three expansible chambers therein, two of said expansible chambers being opposed and constituting running chambers, the third expansible chamber constituting a parking chamber, stationary piston means extending into said expansible chambers, means for subjecting said opposed running chambers to alternate application of fluid pressure through their respective said stationary piston means for effecting reciprocation of said member throughout a runing stroke, and means for subjecting said parking chamber to the application of fluid pressure through its stationary piston means and simultaneously connecting one of said running chambers to drain through its stationary piston means to move said member beyond one end of said running stroke to a parked position.

7. The wiper motor set forth in claim 6 wherein two of said stationary piston means constitute running pistons and include longitudinally extending passages which connect with radial passages and one-way check valves.

8. The wiper motor set forth in claim 7 wherein the running expansible chambers are of stepped diameter, and wherein the running stroke ends are determined at the point where the radial passages in said running pistons are closed by the small diameter sections of the stepped diameter chambers.

9. The wiper motor set forth in claim 7 wherein the third stationary piston means constitutes a parking piston having passage means for connecting said parking chamber to pressure or drain.

References Cited in the file of this patent

UNITED STATES PATENTS

| | | |
|---|---|---|
| 966,059 | Sears | Aug. 2, 1910 |
| 1,036,895 | Parsons | Aug. 27, 1912 |
| 1,417,856 | Perony | May 30, 1922 |
| 2,075,959 | Previti | Apr. 6, 1937 |
| 2,272,033 | Buchmann | Feb. 3, 1942 |
| 2,523,992 | Hess | Sept. 26, 1950 |
| 2,563,068 | Rappl et al. | Aug. 7, 1951 |
| 2,670,720 | Bitzer | Dec. 14, 1954 |
| 2,696,805 | Krohm | Mar. 2, 1954 |
| 2,704,054 | Nordenstam | Mar. 15, 1955 |
| 2,714,371 | Porter | Aug. 2, 1955 |
| 2,762,344 | Nordenstam | Sept. 11, 1956 |